May 9, 1961 L. HEIL ET AL 2,983,780
CIRCUIT ARRANGEMENT FOR INTERCONNECTING TELEPRINTER SUBSCRIBER-NETWORKS
Filed Oct. 25, 1957
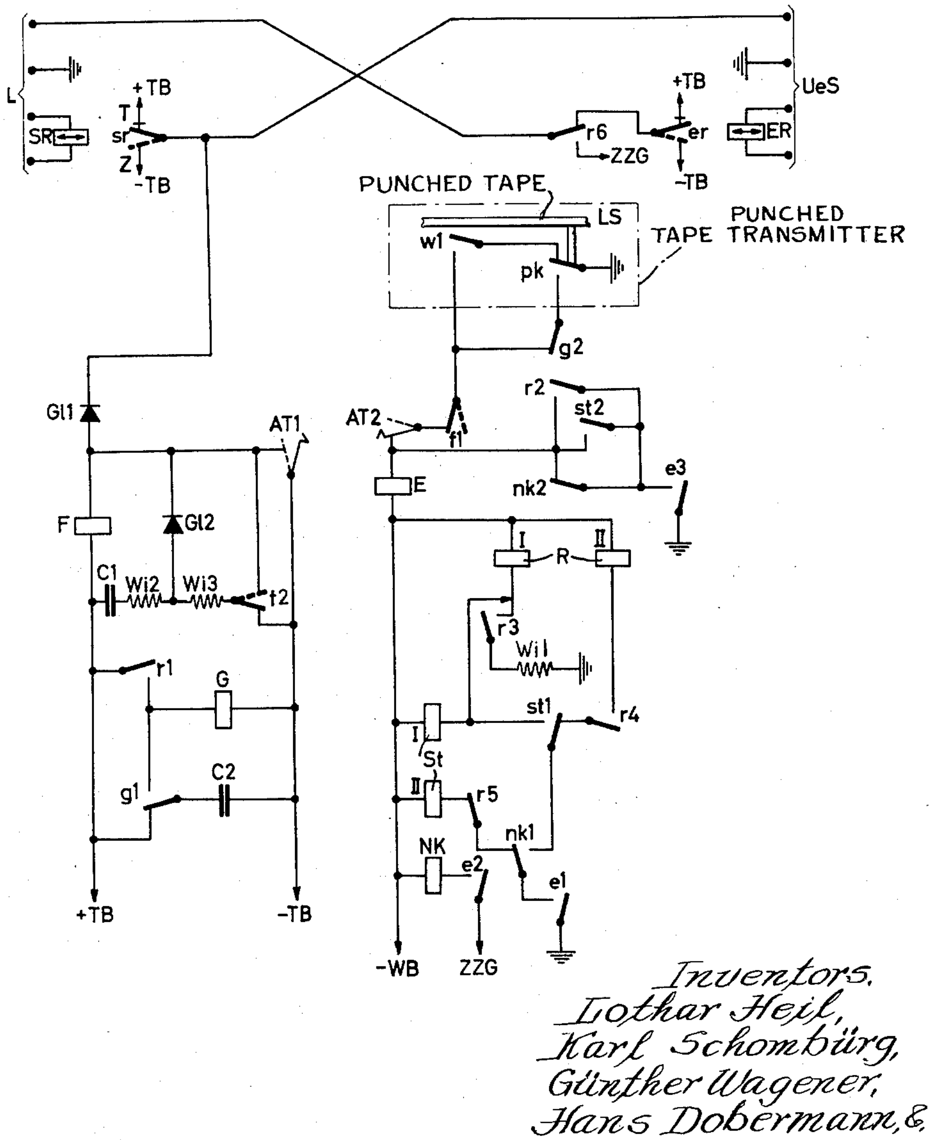
Inventors,
Lothar Heil,
Karl Schomburg,
Günther Wagener,
Hans Dobermann, &
Alfred Menninger.
By [signature] Atty.

2,983,780

CIRCUIT ARRANGEMENT FOR INTERCONNECTING TELEPRINTER SUBSCRIBER-NETWORKS

Lothar Heil, Frankfurt, Karl Schombürg and Günther Wagener, Darmstadt, Hans Dobermann, Munich-Obermenzing, and Alfred Menninger, Munich, Germany, assignors to Siemens & Halske Aktiengesellschaft Berlin and Munich, a corporation of Germany Filed Oct. 25, 1957, Ser. No. 692,322

Claims priority, application Germany Nov. 6, 1956

15 Claims. (Cl. 178—2)

This invention is concerned with a circuit arrangement for interconnecting teleprinter subscriber-networks by way of transmission channels, particularly wireless channels, operating with a delay as compared with the normal teleprinter operating speed.

It is known in the teleprinter technique to use for wireless transmission of messages, in place of the usual five element alphabet or code a seven element code or a securing code which permits to ascertain at the receiving end whether or not individual elements of a teleprinter symbol had been falsified in the transmission. However, the correction of a teleprinter symbol can be obtained only at the expense of reduced transmission speed, since the falsified signals have to be repeated. Accordingly, crowding of the messages may occur at the transition points from the usual line networks to the wireless channels. Such crowding may be particularly troublesome in reciprocal transmitting and receiving operation, because one of the subscribers will always receive an answer after the lapse of a certain interval, without having during such interval any assurance as to whether or not the transmission channel is operating.

The printing of an incoming message may also be suddenly interrupted or the above described delay may be increased in case the receipt of a disturbed signal is during the transmission registered by supervising devices at the wireless channel, such registration requiring stopping of the transmission so as to obtain repetition of the corresponding signal. The waiting subscriber has in such case no knowledge as to the cause of the interruption.

The object of the invention is to provide a circuit arrangement comprising means for always indicating to a subscriber the presence of a pause occurring during a connection due to operating requirements.

This object is according to the invention realized by the provision of switching means, controlled by devices for supervising the transmission channel, which transmit to a waiting subscriber, during a pause occurring due to an operatively necessitated transmission delay, at least once a teleprinter symbol serving as a pause signal. This signal indicates to the subscriber that the transmission is operating, thus avoiding unnecessary inquiries which merely disturb the corresponding connection.

In accordance with a feature of the invention, the pause signal may be a teleprinter signal or symbol that does not cause printing or alteration in the setting of the receiving teleprinter machine, preferably the combination 32 consisting of five signal elements. The telegraph combination 32 is produced in known manner, for example as described in United States Patent No. 2,722,568.

The switching means for causing the transmission of the pause signal may depend upon or be controlled by the operating conditions responsible for the occurrence of a pause, in such a manner, that the pause signal repetition takes place with different spacing indicating or characterizing different operating conditions. It is in this way possible to inform the subscriber of the various causes for the operatively necessitated pauses in the transmission of a message.

The invention may be realized by allotting to the devices involved in a connection, at the transition from the normal subscriber network to the wireless channel, an impulse transmitter of the general type as described in the patent noted above, adapted to produce, for example, the combination 32, and by providing in the line extending to the subscriber a switching contact controlled by a switching relay which is operative whenever a pause occurs in the transmission which is caused by normal operations.

The various objects and features of the invention will now be described with reference to the accompanying drawing showing an embodiment of the invention.

In the upper portion of the drawing is shown a relay transmitter comprising a transmitter relay SR which controls the operation of an armature *sr* and a receiver relay ER which controls the operation of an armature indicated at *er*. The relay transmitter is interposed between the line L, incoming from a subscriber over the teleprinter network, and the wireless transmission channel U*e*S. The transmitter relay SR is operated to space and mark position, respectively in step with the incoming teleprinter signals, and correspondingly affects, by the actuation of its armature *sr*, known alphabet converter and transmitter devices (not shown) belonging to the channel U*e*S. The receiver relay ER is operated in step with the converted teleprinter signals incoming over the wireless channel, and by the actuation of its armature *er* transmits these signals to the subscriber. A punch-tape transmitter or another suitable storage device may in known manner take the place of the relay transmitter.

The circuit for evaluating the normal operation pauses and for transmitting the pause signals is shown in the drawing below the relay transmitter. It comprises essentially an evaluation relay F which operates with a delayed release due to capacitor C1 and a switching relay R. The capacitor C1 in circuit with a resistor W*i*2 and rectifier G*l*2 imparts to the evaluation relay F a release delay sufficient to bridge with certainty the pauses amounting to a few seconds, normally occurring in teleprinting, but assuring its release responsive to pauses of, for example, 10 seconds duration, such as they occur at the conclusion of messages. This feature prevents operative actuation of the circuit arrangement during normal transmission which would otherwise mutilate messages by counter printing.

The operation is as follows:

The key contacts AT1, AT2, the armature *sr* (controlled by relay SR), and the contacts *f*1, *f*2 (controlled by relay F), are in normal or resting condition of the circuit in the dotted line positions. The evaluation relay F and the capacitor C1 are, in such circuit condition, on current over the key contact AT1 from +TB, F, AT1 to —TB, and parallel thereto, from —TB, *sr* in dotted line mark position, rectifier, G/1, F to +TB.

The seizure of the line L by a subscriber causes actuation of the transmitter relay SR and consequent switching of armature *sr* into the space position in which the armature is shown in full line, and in which the relay F is held energized by way of key contact AT1 which is normally in its closed dotted line position, as mentioned before. The evaluation relay F accordingly remains energized during the extension of a connection and the transmission of the combination 32 is during the corresponding interval suppressed.

The key contacts AT1 and AT2 are placed in alternate (full line) position upon completion of the extension of the connection by suitable cam means and the like (not shown) and the evaluation relay F and capacitor C1 now become dependent on the armature *sr*. The subscriber connected to the line L, after completing transmission of his message, will wait for the answer to be transmitted by the subscriber located beyond the transmission channel U*e*S. During the ensuing transmission pause, the armature *sr* will remain in space position in accordance with corresponding energization of the transmission relay SR. The evaluation relay F is now with each terminal of its winding on the positive pole +TB of the battery and deenergizes with a delay determined by the charge on the capacitor C1.

The transmission of a message requires a longer time than the reception thereof, due to the relatively slow transmission speed of the wireless channel, and there may, therefore, be provided a punched tape transmitter LS in the transmission apparatus. The tape scanning contact *pk* will at the corresponding time be in a position opposite to that in which it is shown, closing responsive to release of relay F and consequent switching of contact *f*1 into alternate full line position, a circuit for relay E, which extends from ground, *pk*, contact *g*2 controlled by relay G, *f*1 controlled by relay F, AT2, E to —WB. Relay E energizes and place its contacts *e*1 to *e*3 into alternate actuated position in which contact *e*1 closes a circuit for winding II of relay S*t*, extending from ground, *e*1 contact, *nk*1 controlled by relay NK, *r*5, winding II of S*t* to —WB. Relay S*t*, upon actuation, prepares at its contact *st*1 a holding circuit extending by way of its winding I. At contact *e*2, relay E prepares a circuit for relay NK, which will be closed in predetermined intervals, by a signal and timing transmitter ZZG (not shown), that is, always incident to a stop element of a teleprinter symbol., thus causing the relay NK to operate in step with the stop elements. Upon operation, relay NK disconnects the energizing winding II of relay S*t* at its contact *nk*1, closing at the same time the circuit for the holding winding I of relay S*t* such circuit extending by way of contact *st*1 controlled by relay S*t*.

In case the energization of relay E is not effected during the stop signal element, relay S*t* will instantly energize as described; however, if relay E is energized during a stop signal element, relay S*t* will energize only after the conclusion of such stop signal element because its actuating time is longer than that of relay NK. This feature assures the start of scanning to coincide always with the start of a new 5-element combination.

Contact *nk*1 controlled by relay NK also closes a circuit for energizing switching relay R over its winding I, from ground, *e*1, *nk*1, *st*1, normal contact of break-before-make contact *r*3 which is controlled by relay R, winding I of relay R to —WB. Relay R energizes over its winding I and closes at its make contact *r*3 a holding circuit for itself which is independent of relays E and NK, such holding circuit extending over resistor W*il* to ground. At contact *r*1, relay R closes a circuit for relay G, extending from +TB, *r*1, G to —TB. Relay G, upon actuating closes its contact *g*1, thereby connecting capacitor C2 in parallel with its winding. At contact *r*6 (top of the figure), relay R disconnects the line leading to the subscriber from the armature *er* and connects such line with the signal and timing transmitter ZZG which transmits, for example, the combination 32. The waiting subscriber therefore receives the pause signal provided in accordance with the invention.

Contacts *r*2, *r*4 and *r*5 are actuated by relay R at the time of actuating contacts *r*1, *r*3 and *r*6. Contact *r*2 holds relay E energized independent of the contacts controlled by relays NK and S*t*; contact *r*4 prepares a circuit for winding II of relay R; and contact *r*5 opens to prevent renewed energization of relay S*t* over its winding II.

Upon renewed closure of the circuit for the relay NK, by the signal and timing transmitter ZZG, extending from —WB, NK, *e*2 to ground at ZZG, contact *nk*1, in its operated alternate position, will close a circuit for winding II of relay R to effect deenergization thereof due to opposite polarization, the circuit extending from ground, *e*1, *nk*1, *st*1, *r*4, winding II of relay R to —WB. This feature assures transmission of the pause signal once and only once.

Relay G remains operated for an interval following the release of relay R, due to delay determined by capacitor C2, and relay E therefore can energize again only after the lapse of the corresponding delay interval, its energization circuit over *r*2 and *nk*2 or *st*2, respectively, having been interrupted responsive to release of these relays. This feature assures transmission of the next pause signal only after a predetermined interval, for example, four seconds, which is determined by the release delay of relay G.

Relay R, upon releasing, restores contact *r*6 to the position shown, thereby reconnecting the subscriber with the armature *er* of the receiver relay.

If there remains in the transmitter a punched tape with stored message signals after the release delay of relay G, contact *pk* in the tape transmitter LS will remain closed, and the described operations are repeated automatically. The repetition of the transmission of the pause signal in spaced intervals of four seconds is interrupted by restoration of contact *pk* into the position shown, only after the punched tape loop is exhausted, that is, only after the entire message has been transmitted to the other subscriber over the wireless channel. The subscriber on line L then remains connected with the receiver relay at the teleprinter exchange position and thus can receive the message transmitted from the subscriber communicating over the wireless channel U*e*S.

In case of an automatic check-back based upon reception of a disturbed signal, the operations will be effected as described, except that the energization circuit for relay E is closed over contact *w*1 instead of contact *pk*. Contact *w*1 is controlled by a relay (not shown) which is energized by the internationally accepted check-back combination RQ. The energizating circuit for relay E thereby extends from ground, *pk*, *w*1, *f*1, AT2, E to —WB. The timing of the transmission of the pause signal is in such a case not controlled by the relay G but by the relay which controls contact *w*1. The corresponding relay is for the purpose of characterizing another kind of pause directly controlled by the check-back device, operating, for example after each fourth teleprinter symbol, thus corresponding to a timing according to intervals of about ½ second.

Changes may be made within the scope and spirit of the appended claims.

We claim:

1. A teleprinter network for use with a like network operatively connected therewith by a transmission channel for two-way communication operative at a slower transmission speed than the transmission speeds utilized within the respective teleprinter networks, each network including a transmission device, first switching means cooperably associated with the transmission device for supervising the operating condition of the transmission channel, second switching means operatively associated with the respective networks for effecting automatic correction of errors occurring along the transmission channel such as atmospheric disturbances, and third switching means operatively related to the second switching means associated with said network for transmitting, at least once, to the subscriber directly connected to such network, during a printing pause caused by a normal transmission delay, a teleprinter symbol serving as a pause signal.

2. Circuit arrangement according to claim 1, wherein said channel is a wireless channel.

3. Circuit arrangement according to claim 2, wherein said teleprinter symbol is of a character that does not cause either printing thereof or alteration in the setting of the teleprinter machine at the subscriber to which said symbol is transmitted.

4. Circuit arrangement according to claim 3, wherein a five element teleprinter combination corresponding to the number 32 constitutes said pause-indicating symbol.

5. Circuit arrangement according to claim 1, comprising circuit means forming part of said switching means for repeating for the duration of said pause transmission of said pause-indicating symbol in intervals spaced by at least one symbol length.

6. Circuit arrangement according to claim 5, comprising circuit means for effecting repetition of transmission of said pause-indicating symbol at differently spaced intervals characteristic of different causative operating conditions.

7. Circuit arrangement according to claim 6, wherein the causative operating condition resides in the repetition of transmission of disturbed signals, and control means involved in such repetition of disturbed signals for controlling the operation of said switching means.

8. Circuit arrangement according to claim 7, wherein a pause-indicating symbol is incident to each repetition of a disturbed symbol transmitted to the subscriber waiting for the reception of the symbol which is to be repeated.

9. Circuit arrangement according to claim 2, comprising signal storage means for messages transmitted by a subscriber for transmission over said wireless channel, and means governed by the operation of said storage means in the transmission of a message over said wireless channel for causing said switching means to transmit to the transmitting subscriber said pause-indicating symbol in predetermined spaced intervals.

10. Circuit arrangement according to claim 9, comprising punched tape forming part of said signal storage and transmission means and having means for supervising the tape length between the reception and retransmission parts thereof, said supervising means governing the operation of said switching means for the transmission of said pause-indicating symbol.

11. Circuit arrangement according to claim 1, having a line conductor extending to an armature of a receiver relay, said switching means for the transmission of said pause-indicating symbol comprising a switching relay, relay means for evaluating the nature of pauses occurring in the transmission of said channel, means governed by said relay means for controlling the actuation of said switching relay, and contact means controlled by said switching relay and connected to said line conductor.

12. Circuit arrangement according to claim 11, having a transmitter relay and a transmitting armature controlled thereby, said evaluating relay means comprising a first relay controlled by the position of said transmitting armature and means controlled by a second relay which is governed by symbol retransmitting means.

13. Circuit arrangement according to claim 12, comprising a switching contact operatively governed by message transmitting means for controlling the operative actuation of one of said evaluating relay means.

14. In a teleprinter system wherein a first subscriber is for two-way communication interconnected over a wireless channel with a second subscriber by way of a transmitter disposed at the juncture of said wireless channel and a line connecting said first subscriber, said transmitter comprising a transmitter relay controlled from the first subscriber and having a transmitter armature for transmitting signals over said wireless channel and also comprising a receiver relay controlled from said wireless channel and having an armature for transmitting signals over said line to the first subscriber; a device associated with said transmitter for transmitting to said first subscriber pause signals indicative of normal communication delays due to lower signal transmission speed over said wireless channel, said device comprising control means for effecting transmission over said wireless channel, a switching relay, delay-evaluation means for controlling the actuation of said switching relay, a signal source, and contact means controlled by said switching relay for disconnecting said line from the armature of said receiver relay while connecting such line with said signal source to transmit said pause signals to said first subscriber.

15. In a teleprinter system wherein a first subscriber is for two-way communication interconnected over a wireless channel with a second subscriber by way of a transmitter disposed at the juncture of a line and said wireless channel, said transmitter comprising a transmitter relay controlled from the first subscriber and having a transmitter armature for transmitting signals over said wireless channel and also comprising a receiver relay controlled from said wireless channel and having an armature for transmitting signals over said line to the first subscriber; a device for transmitting to said first subscriber pause signals indicative of normal communication delays due to lower signal transmission speed over said wireless channel, said device comprising control means for effecting transmission over said wireless channel, a switching relay, delay-evaluation means for controlling the actuation of said switching relay, a signal source, and contact means controlled by said switching relay for disconnecting said line from the armature of said receiver relay, means for controlling the actuation of said switching relay comprising a slow-to-release relay connected with said transmitting armature, a first control relay operatively actuated responsive to release of said slow-to-release evaluation relay, second control relay means controlled by said first control relay for intermittently energizing said switching relay for the duration of said communication delay, a signal source, and means controlled by said switching relay for disconnecting said line from the armature of said receiver relay while connecting such line with said signal source to transmit said pause signals to said first subscriber.

References Cited in the file of this patent

UNITED STATES PATENTS

| | | |
|---|---|---|
| 2,020,822 | Callahan | Nov. 12, 1935 |
| 2,044,519 | Usselman | June 16, 1936 |
| 2,132,124 | Peterson | Oct. 4, 1938 |
| 2,706,215 | Van Duuren | Apr. 12, 1955 |
| 2,820,089 | Schouten | Jan. 14, 1958 |
| 2,870,254 | Slayton | Jan. 20, 1959 |